United States Patent

Zen et al.

Patent Number: 6,007,339
Date of Patent: Dec. 28, 1999

[54] APPARATUS AND METHOD FOR INPUTTING MANDARIN PHONETIC SYMBOLS BY USING SIXTEEN KEYS

[75] Inventors: James Zen, Pin Tung Hsien; Simon Hwang, Taipei, both of Taiwan

[73] Assignee: Eten Information System Co., Ltd., Taipei Hsien, Taiwan

[21] Appl. No.: 08/762,228

[22] Filed: Dec. 9, 1996

[51] Int. Cl.⁶ ............................. G09B 19/06; G09B 19/08
[52] U.S. Cl. ......................... 434/157; 434/227; 400/110; 707/535; 341/28; 345/171
[58] Field of Search .................... 434/118, 156, 434/157, 159, 162, 167, 169, 185, 307 R, 308, 227; 400/110, 102, 109; 341/28, 22, 20, 21; 345/171, 173; 707/535; 704/235, 200

[56] References Cited

U.S. PATENT DOCUMENTS

| | | | |
|---|---|---|---|
| 4,096,934 | 6/1978 | Kirmser et al. | 400/110 |
| 4,500,872 | 2/1985 | Huang | 341/28 |
| 4,543,631 | 9/1985 | Kurosu et al. | 434/157 X |
| 4,565,459 | 1/1986 | DiLucia | 400/110 |
| 4,684,926 | 8/1987 | Yong-Min | 341/28 |
| 4,920,492 | 4/1990 | Wang | 707/535 |
| 4,937,745 | 6/1990 | Carmon | 707/535 |
| 4,951,202 | 8/1990 | Yan | 707/535 |
| 5,047,932 | 9/1991 | Hseih | 704/3 |
| 5,119,296 | 6/1992 | Zheng et al. | 707/535 |
| 5,164,900 | 11/1992 | Bernath | 707/535 |
| 5,331,557 | 7/1994 | Liu | 707/535 |
| 5,360,343 | 11/1994 | Tang | 434/157 X |
| 5,787,230 | 7/1998 | Lee | 704/235 |

*Primary Examiner*—Joe H. Cheng
*Attorney, Agent, or Firm*—McDermott, Will & Emery

[57] ABSTRACT

The present invention relates to a mandarin phonetic inputting apparatus by using sixteen keys. It achieves the purpose of conveniently operating for those people are not skilled in typewriting, and provides a capability of detecting ambiguous tones in mandarin language for degrading reentering caused by misunderstanding the ambiguous tones, and furthermore, to serve as a user input interface in a handhold calculator with more economical efficiency.

16 Claims, 4 Drawing Sheets

| GROUP | Mandarin Phnetic Symbols |
|---|---|
| 1 | ㄅㄆㄇㄈㄉㄊㄋㄌㄍㄎㄏㄐㄑㄒㄓㄔㄕㄖㄗㄘㄙ |
| 2 | ㄧㄨㄩ |
| 3 | ㄚㄛㄜㄝㄞㄟㄠㄡㄢㄣㄤㄥㄦ |
| 4 | First tone, Second tone, Third tone, Fourth tone, and Neutral tone |

FIG. 3

APPARATUS AND METHOD FOR INPUTTING MANDARIN PHONETIC SYMBOLS BY USING SIXTEEN KEYS

BACKGROUND OF THE INVENTION

1. Field of the Invention

The present invention related to an inputting apparatus of mandarin phonetic symbols, especially to a novel phonetic symbols inputting apparatus with only sixteen inputting keys. It is convenient to construct an inputting apparatus of mandarin phonetic symbols after degrading the required keys and area, and furthermore, becomes an invention with significant contribution in economical.

2. Description of the Prior Art

Everyone who uses mandarin inputting schemes knows, that inputting scheme of phonetic symbols needs 41 keys and space bar of a conventional keyboard for receiving inputs of 37 mandarin phonetic symbols, 4 tones, and neutral tone. Although this type of one-by-one mapping scheme is convenient for typewriting, but becomes a disadvantage to a small system while establishes such a phonetic symbol inputting interface. A consideration is that a great deal of keys are needed, to increase those keys in a small apparatus such as handhold calculator will upgrade cost and size of the apparatus.

In addition, conventional inputting scheme of mandarin phonetic symbols can not allow inputting error. A lot of ambiguous tones in mandarin, such as curly tones ("ㄉ and ㄖ", "ㄓ and ㄗ", "ㄔ and ㄘ", and "ㄕ and ㄙ"), some vowels ("ㄜ and ㄝ", "ㄢ and ㄤ", and "ㄣ and ㄥ"), and sounds in mandarin (first tone, second tone, third tone, fourth tone, and neutral tone) that cause inconvenience for some users who will need to reenter for misunderstanding the ambiguous tones. Thus, traditional inputting scheme of the mandarin phonetic symbols needs some further improvements.

SUMMARY OF THE INVENTION

The principle object of the present invention is to provide a small system such as handhold calculator to establish an inputting apparatus of mandarin phonetic symbols only by using sixteen keys.

The other object of the invention is to provide the inputting apparatus of the mandarin phonetic symbols being capable of detecting ambiguous tones in mandarin without reentering once again while inputting errors are detected caused by misunderstanding.

The novel mandarin phonetic inputting apparatus divides and regroups the general mandarin phonetic symbols and tones into sixteen groups, also makes members of a group share the same key. The sixteen groups are "ㄅ and ㄚ", "ㄆ, ㄛ, and ㄞ", "ㄇ and ㄝ", "ㄈㄩ, and ㄥ", "ㄉ and ㄕ", "ㄊ, and ㄟ", "ㄋ, and ㄠ", "ㄌ and ㄨ", "ㄍ and first tone", "ㄎ, ㄢ, and neutral tone", "ㄏ and ㄣ", "ㄐ, ㄧ, ㄩ, and second tone", "ㄑ, ㄔ, ㄘ, and third tone", "ㄒ, ㄗ, ㄙ, and fourth tone", "— and ㄦ", and "ㄖ and ㄤ". By using the placing mentioned above, to construct a mandarin phonetic symbol inputting interface in a small apparatus becomes an easy task.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 illustrates a table for listing categorical groups among mandarin phonetic symbols and tones.

DESCRIPTION OF THE PREFERRED EMBODIMENT

Figure 1:
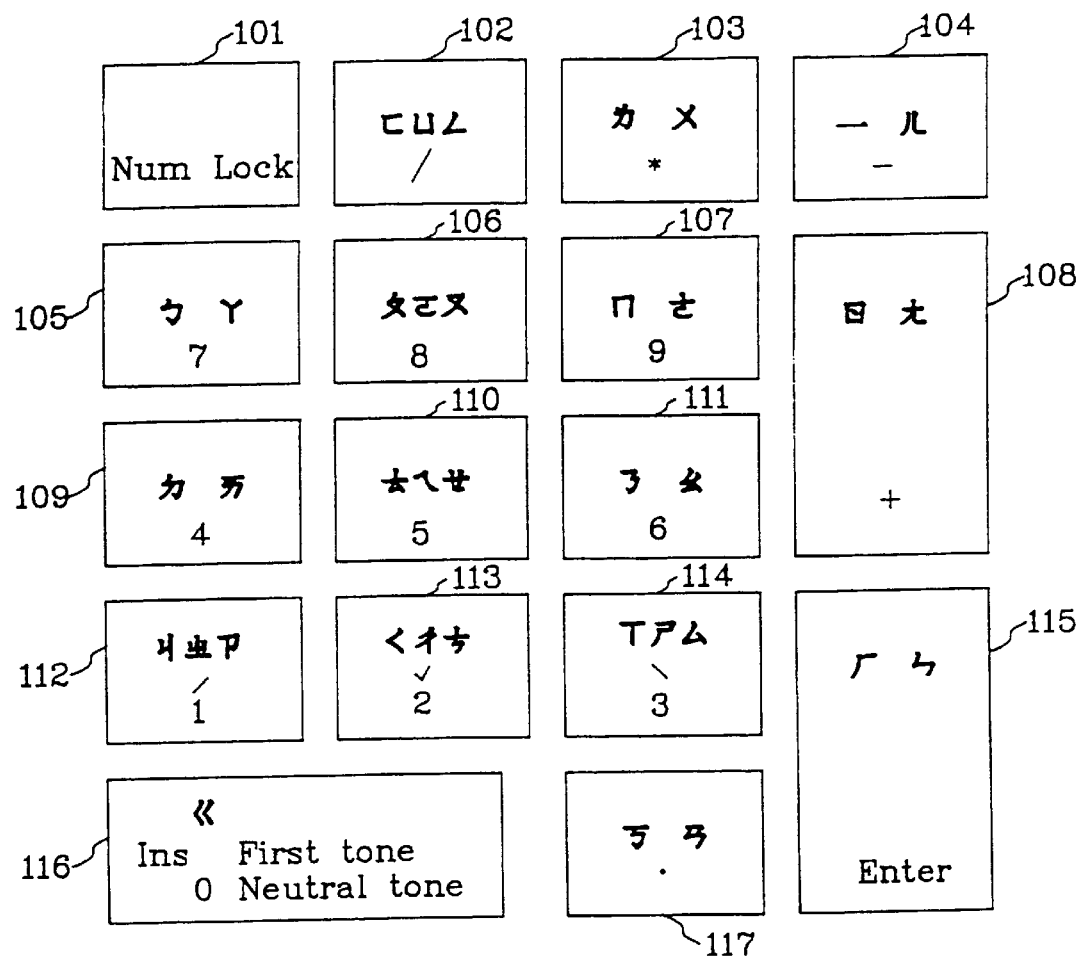
FIG. 1 shows an interface of the sixteen keys mandarin phonetic symbol inputting apparatus according to the present invention.

FIG. 1 illustrates a block diagram of an inputting interface of the sixteen keys mandarin phonetic symbol inputting apparatus (referring to "sixteen keys apparatus" for short) according to the present invention. As referring to FIG. 1, except a key "Num Lock" 101, the other sixteen keys can receive "/, ㄈ, ㄩ, and ㄥ" 102, "*, ㄉ, ㄨ" 103, "—, and ㄦ," 104, "7, ㄅ and ㄚ" 105, "8, ㄆ, ㄛ, and ㄞ" 106, "9, ㄇ and ㄝ" 107, "+, ㄖ and ㄤ" 108, "4, ㄊ, and ㄟ" 109, "5, ㄠ, ㄋ, and ㄌ" 110, "6, ㄎ and ㄢ", 111, "1, ㄐ, ㄧ, ㄩ, and, second tone" 112, "2, ㄑ, ㄔ, ㄘ, and third tone" 113, "3, ㄒ, ㄗ, ㄙ, and fourth tone" 114, "Enter, ㄏ, ㄣ" 115 "Ins, 0, ㄍ, first tone, and neutral tone" 116, and "., ㄎ and ㄢ" 117.

FIG. 3 lists a table for dividing the phonetic symbols and tones of mandarin language into four groups. The first group contains "ㄅ, ㄆ, ㄇ, ㄈ, ㄉ, ㄊ, ㄋ, ㄌ, ㄍ, ㄎ, ㄏ, ㄐ, ㄑ, ㄒ, ㄓ, ㄔ, ㄕ, ㄖ, ㄗ, and ㄙ"; the second group includes "—, ㄨ, and ㄩ"; the third group is composed of "ㄚ, ㄛ, ㄜ, ㄝ, ㄞ, ㄟ, ㄠ, ㄡ, ㄢ, ㄣ, ㄤ, ㄥ, and ㄦ"; the four tones and the neutral tone of mandarin language are then grouped into the fourth group. Because a mandarin word must not contain more than one phonetic symbol in the same group of above, when a phonetic symbol combination includes members classified in the same group shown in FIG. 3, this combination should be removed based on irregular to mandarin tones. More descriptions of operations to this inputting scheme of the phonetic symbols are given later.

The above analysis in the invention is obtained from detail analyzing among the combination structure of mandarin phonetic symbols, including 4 groups in FIG. 3, some ambiguous tones in mandarin, such as curly tones ("ㄉ and ㄖ", "ㄓ and ㄗ", "ㄔ and ㄘ", and "ㄕ and ㄙ"), some vowels ("ㄜ and ㄝ", "ㄢ and ㄤ", and "ㄣ and ㄥ"), and sounds in mandarin (first tone, second tone, third tone, fourth tone, and neutral tone) that may be ambiguous parts to some users.

Figure 2A:
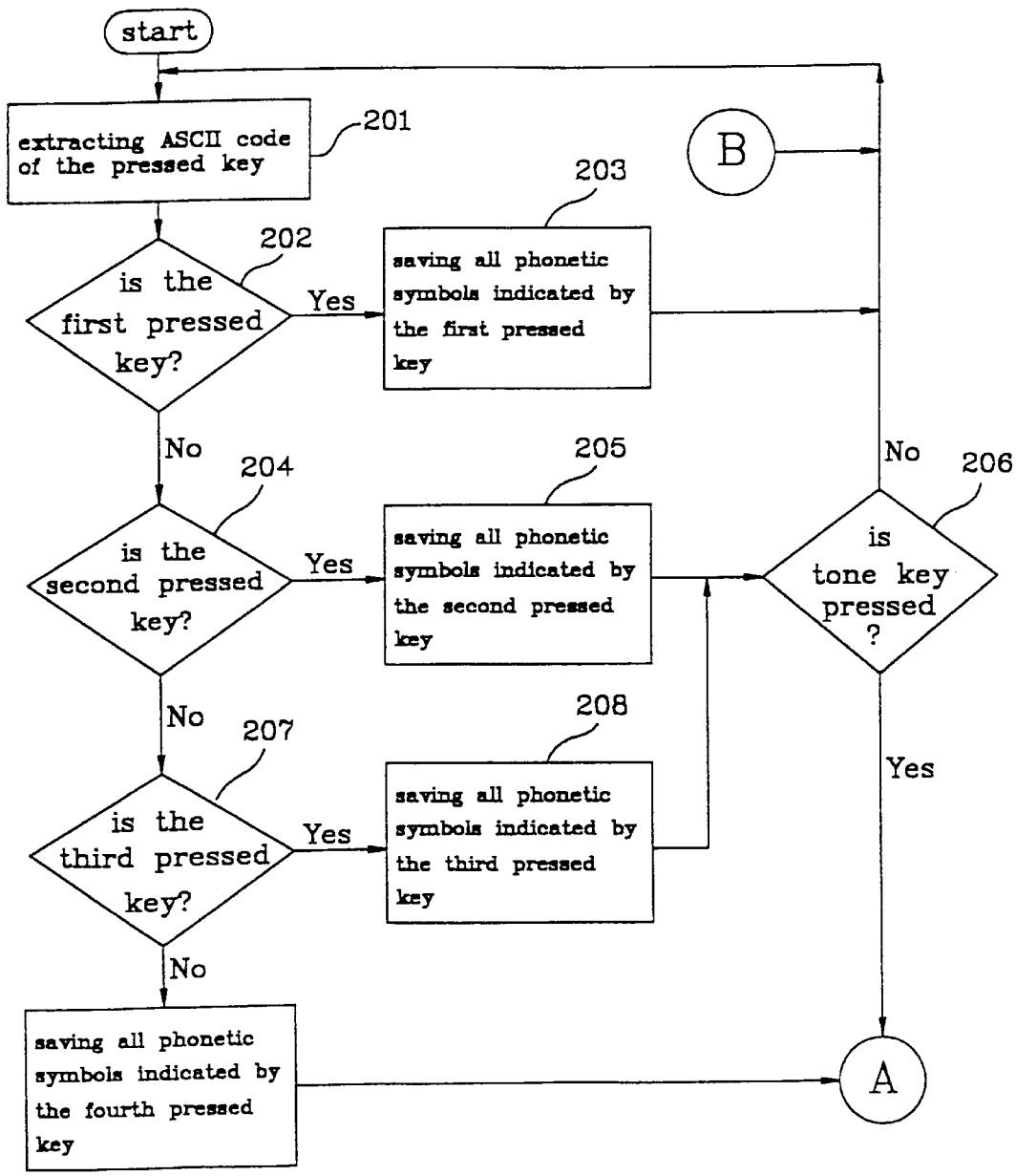
FIGS. 2A and 2B summarize the operations of the sixteen keys mandarin phonetic symbol inputting apparatus.
Figure 2B:
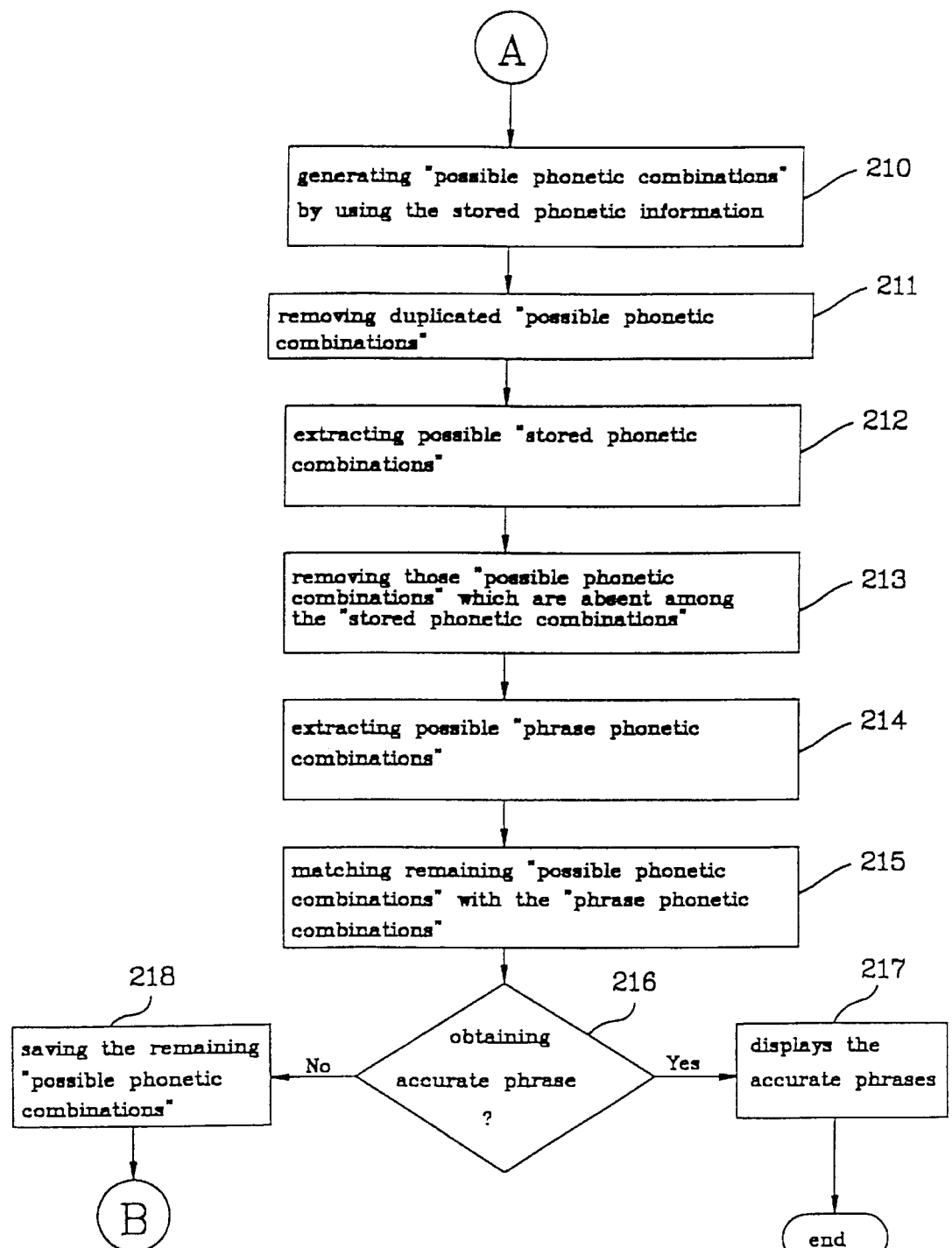

FIGS. 2A and 2B represent a flow chart summarizing inputting operations of the sixteen keys apparatus. Where the FIG. 2A displays operations of inputting a mandarin word, the FIG. 2B represents operations of adjusting whether words or phrases obtained by phonetic combinations from the inputting are meaningful or not, and shows a final result to users.

When a user presses a key from the sixteen keys apparatus, ASCII code of the pressed key will be extracted, at first (step 201). If the pressed key is the first input key (step 202), all phonetic symbols indicated by the pressed key are stored (step 203). The sixteen keys apparatus then waits for another input from the user.

If the pressed key is the second (step 204), or the third key (step 207), after storing all phonetic symbols indicated by the pressed key (step 205, 208), the sixteen keys apparatus will check whether the pressed key includes tone information or not (step 206). If it does, then terminates all inputting operations, otherwise, the sixteen keys apparatus will wait for next inputting. If the pressed key is the fourth key (step 209), all inputting operations are also terminated.

Because phonetic inputting scheme to any mandarin word must complete with a tone input, when a user inputs a tone input implies ends the current word. In addition, a mandarin word contains at most 3 phonetic symbols, it implies that the fourth input must be a tone input, followed by ends of all input operations to the current word.

After completing input operations, the sixteen keys apparatus will verify whether the received phonetic information can combine meaningful words or phrases. At first, "possible phonetic combinations" will be generated by using the stored phonetic information (passes through label A to step 210), and based on the category in the FIG. 3 to remove those combinations that includes members in the same group (step 211). Next, extracting possible "stored phonetic combinations" from database to compare with the obtained "possible phonetic combinations" (step 212). Based on the "stored phonetic combinations", those "possible phonetic combinations" that are absent in the "stored phonetic combinations" will be removed (step 213). Right now, all obtained phonetic combinations are meaningful mandarin "word" but meaningful "phrase".

Assume that a mandarin word has been stored in the sixteen keys apparatus, a possible meaning mandarin phrase may be obtained by combining the stored word and the current input word to be a "current phrase combination". The sixteen keys apparatus will extract "phrase phonetic combinations" from the database (step 214), and compare them with the "current phrase combination" (step 215). If "current phrase combination" constructs meaningful mandarin phrases, all these phrases will be displayed by the sixteen keys apparatus (step 218), otherwise, the remaining "possible phonetic combinations" will be stored and wait for next input (passes through label B to step 201).

The sixteen keys apparatus can compare phrases with more than two words in step 214 and 215. In addition, a single mandarin word does not construct a phrase, yet, it is impossible to attain a meaningful phrase in step 216. The sixteen keys apparatus will wait for next input (passes through label B to step 201) after saving phonetic information of the single word (step 201).

After introducing operations of the novel sixteen keys apparatus disclosed in the present invention, an example of inputting "注音" is given for further explaining. Because phonetic structure of "注" is "ㄓ, ㄨ, and fourth tone", a key-pressed order of inputting "注" by using the keyboard in FIG. 1 follows "1, ㄐ, ㄓ, ㄗ, and second tone" (step 201, 202, 203, and returns to step 201), "*, ㄉ, ㄨ" (step 201, 204, 205, 206, and returns to step 201), "3, ㄊ, ㄏ, ㄙ, and fourth tone" (step 201, 204, 207, 208, 206, to label A). This completes inputting of the mandarin word of "注".

Although phonetic information of the "注" had been saved, but some further analysis are needed to realize the information exactly represent the mandarin word "注". The sixteen keys apparatus first generates "possible phonetic combinations". Total 4×2×4=32 combinations are obtained by using phonetic information of the word "注" (because "ㄐ, ㄓ, ㄗ, and second tone", "ㄉ, ㄨ", "ㄊ, ㄏ, ㄙ, and fourth tone" contain 4, 2, and 4 phonetic symbol information, respectively), but combinations which are irregular to mandarin language must be removed.

For example; the above phonetic information can generate a combination of "ㄐ, ㄉ, and ㄊ" (step210). It is obvious that all members of this combination are belonged to the first group in FIG. 3, and thus, this combination needs to be removed because it is a irregular combination to mandarin language. After removing all such irregular phonetic combinations, finally, 3 combinations "ㄐ, ㄨ, and fourth tone", "ㄓ, ㄨ, and fourth tone", and "ㄗ, ㄨ, fourth tone" are remained (step 211). After comparing with "stored phonetic combinations", only "ㄓ, ㄨ, and fourth tone" is left (because "ㄐ, ㄨ, and fourth tone" and "ㄗ, ㄨ, fourth tone" do not exist in mandarin language), and the phonetic information of the word "注" is exactly obtained by the sixteen keys apparatus (step 212 and 213).

The order of pressing keys for inputting the word "音" is "−, ─, and ㄐ", "Enter, ㄏ, and ㄣ", and "Ins, 0, ㄍ, and first tone", and 2×2×3=12 combinations are obtained. After removing all combinations with members in the same group according to FIG. 3, two combinations " ─, ㄣ, and first tone" and " ─, ㄣ, and neutral tone" are left. Because " ─, ㄣ, and neutral tone" does not exist, only " ─, ㄣ, and first tone" is remained. Combine the stored word "注", all phonetic information currently saved in the sixteen keys apparatus are " ㄓ, ㄨ, fourth tone" and " ─, ㄣ, and first tone" represent "注" and "音", respectively.

A database stored "phrase phonetic combinations" of mandarin phrase is needed for verify whether the stored phonetic information can establish meaningfuil phrases or not. According to the above example, a mandarin phrase "注音" will be displayed after comparing with "phrase phonetic combinations".

As the present invention has been described with preferred embodiment, it will be obvious to those skilled in the art that various modifications may be made. For example, combinations to those mandarin phonetic symbol information with other information in a key, or different kinds of placing of keys, but not change the combination of phonetic information in a key. These variations to the described embodiment of the present invention, the scope of which is limited by the following claims.

What is claimed is:

1. An inputting apparatus of mandarin phonetic symbols by using sixteen keys, wherein said inputting apparatus comprises:

a first key for receiving an input chosen from the group consisting of "ㄣ and ㄚ" of mandarin phonetic symbols;

a second key for receiving an input chosen from the group consisting of "ㄨ, ㄛ, and ㄡ" of mandarin phonetic symbols;

a third key for receiving an input chosen from the group consisting of "ㄇ and ㄜ" of mandarin phonetic symbols;

a fourth key for receiving an input chosen from the group consisting of "ㄈ, ㄩ, and ㄥ" of mandarin phonetic symbols;

a fifth key for receiving an input chosen from the group consisting of "ㄉ and ㄞ" of mandarin phonetic symbols;

a sixth key for receiving an input chosen from the group consisting of "ㄊ, ㄟ, and ㄝ" of mandarin phonetic symbols;

a seventh key for receiving an input chosen from the group consisting of "ㄋ and ㄠ" of mandarin phonetic symbols;

an eighth key for receiving an input chosen from the group consisting of "ㄌ and ㄨ" of mandarin phonetic symbols;

a ninth key for receiving an input chosen from the group consisting of "ㄍ and first tone, and fifth tone" of mandarin phonetic symbols;

a tenth key for receiving an input chosen from the group consisting of "ㄏ and ㄣ" of mandarin phonetic symbols;

an eleventh key for receiving an input chosen from the group consisting of "ㄐ, ㄓ, ㄗ, and second tone" of mandarin phonetic symbols;

a twelfth key for receiving an input chosen from the group consisting of "ㄑ, ㄔ, ㄘ, and third tone" of mandarin phonetic symbols;

a thirteenth key for receiving an input chosen from the group consisting of "ㄒ, ㄕ, ㄙ, and fourth tone" of mandarin phonetic symbols;

a fourteenth key for receiving an input chosen from the group consisting of "ㄅ and ㄢ" of mandarin phonetic symbols;

a fifteenth key for receiving an input chosen from the group consisting of "ㄖ and ㄤ" of mandarin phonetic symbols; and a sixteenth key for receiving an input chosen from the group consisting of "一 and ㄦ" of mandarin phonetic symbols.

2. The apparatus according to claim 1, wherein said first tone is the first tone of mandarin.

3. The apparatus according to claim 1, wherein said second tone is the second tone of mandarin.

4. The apparatus according to claim 1, wherein said third tone is the third tone of mandarin.

5. The apparatus according to claim 1, wherein said fourth tone is the fourth tone of mandarin.

6. The apparatus according to claim 1, wherein said fifth tone is the neutral tone of mandarin.

7. The apparatus according to claim 1, further comprising a method for said apparatus to receive said mandarin phonetic symbols, wherein said method comprises the steps of:

inputting a plurality pieces of phonetic symbol information representative of mandarin words by using said sixteen keys;

inputting a tone information representative of mandarin tones by using said sixteen keys;

generating a plurality of phonetic combinations by using said phonetic symbol information and said tone information, wherein each one of said phonetic combinations represents a candidate mandarin word;

removing non-existent combinations from said plurality of phonetic combinations; and storing existent phonetic combinations.

8. The method according to claim 7, wherein said tone information is a tone chosen from the group consisting of aid first tone, said second tone, said third tone, said fourth tone, and a neutral tone of mandarin language.

9. An inputting apparatus of mandarin phonetic symbols said apparatus can be constructed in a computer or a handhold system for inputting phonetic symbols and tones of mandarin by using only sixteen keys, wherein said inputting apparatus comprises:

a first key for receiving an input chosen from the group consisting of "ㄅ and ㄚ" of mandarin phonetic symbols;

a second key for receiving an input chosen from the group consisting of "ㄆ, ㄛ, and ㄨ" of mandarin phonetic symbols;

a third key for receiving an input chosen from the group consisting of "ㄇ and ㄜ" of mandarin phonetic symbols;

a fourth key for receiving an input chosen from the group consisting of "ㄈ, ㄩ, and ㄥ" of mandarin phonetic symbols;

a fifth key for receiving an input chosen from the group consisting of "ㄉ and ㄞ" of mandarin phonetic symbols;

a sixth key for receiving an input chosen from the group consisting of "ㄊ, ㄟ, and ㄝ" of mandarin phonetic symbols;

a seventh key for receiving an input chosen from the group consisting of "ㄋ and ㄠ" of mandarin phonetic symbols;

an eighth key for receiving an input chosen from the group consisting of "ㄌ and ㄨ" of mandarin phonetic symbols;

a ninth key for receiving an input chosen from the group consisting of "ㄍ and first sound, and fifth sound" of mandarin phonetic symbols;

a tenth key for receiving an input chosen from the group consisting of "ㄏ and ㄣ" of mandarin phonetic symbols;

an eleventh key for receiving an input chosen from the group consisting of "ㄐ, ㄓ, ㄗ, and second sound" of mandarin phonetic symbols;

a twelfth key for receiving an input chosen from the group consisting of "ㄑ, ㄔ, ㄘ, and third sound" of mandarin phonetic symbols;

a thirteenth key for receiving an input chosen from the group consisting of "ㄒ, ㄕ, ㄙ, and fourth sound" of mandarin phonetic symbols;

a fourteenth key for receiving an input chosen from the group consisting of "ㄅ and ㄢ" of mandarin phonetic symbols;

a fifteenth key for receiving an input chosen from the group consisting of "ㄖ and ㄤ" of mandarin phonetic symbols; and a sixteenth key for receiving an input chosen from the group consisting of "一 and ㄦ" of mandarin phonetic symbols.

10. The apparatus according to claim 9, wherein said first sound is the first tone of mandarin.

11. The apparatus according to claim 9, wherein said second sound is the second tone of mandarin.

12. The apparatus according to claim 9, wherein said third sound is the third tone of mandarin.

13. The apparatus according to claim 9, wherein said fourth sound is the fourth tone of mandarin.

14. The apparatus according to claim 9, wherein said fifth sound is the neutral tone of mandarin.

15. The apparatus according to claim 9, further comprising a method for said apparatus to receive aid mandarin phonetic symbols, wherein said method comprises the steps of:

inputting a plurality pieces of phonetic symbol information representative of mandarin words by using said sixteen keys;

inputting a tone information representative of mandarin tones by using said sixteen keys;

generating a plurality of phonetic combinations by using said phonetic symbol information and said tone information, wherein each one of said phonetic combinations represents a candidate mandarin word;

removing non-existent combinations from said plurality of phonetic combinations; and storing existent phonetic combinations.

16. The method according to claim 15, wherein said tone information is a tone chosen from the group consisting of aid first tone, said second tone, said third tone, said fourth tone, and a neutral tone of mandarin language.

* * * * *